United States Patent [19]

August

[11] 4,301,618

[45] Nov. 24, 1981

[54] GROWING FRAME

[76] Inventor: Patrick L. August, 82 Mariposa Ave., Watsonville, Calif. 95076

[21] Appl. No.: 176,928

[22] Filed: Aug. 11, 1980

[51] Int. Cl.$^3$ ............................................. A01G 17/06
[52] U.S. Cl. ........................................................ 47/46
[58] Field of Search .................................... 47/43–47, 47/19, 26, 31, 32; 256/5, 19, 45, 50, 66; 160/375, 376, 378, 392, 395, 380, 379, 391

[56] References Cited

U.S. PATENT DOCUMENTS

| 601,438 | 3/1898 | Ericksson | 47/47 |
| 1,092,442 | 4/1914 | Higgin | 160/376 |
| 1,502,693 | 7/1924 | Stickle | 160/395 |
| 2,132,568 | 10/1938 | Jacobs | 47/45 X |
| 2,606,608 | 8/1952 | Stewart | 160/395 X |
| 2,778,100 | 1/1957 | Lipman | 160/395 X |
| 2,842,898 | 7/1958 | Buckles | 47/46 |
| 3,374,597 | 3/1968 | Whitener | 160/391 X |
| 3,537,688 | 11/1970 | Stein | 47/26 X |

FOREIGN PATENT DOCUMENTS

| 2288455 | 5/1976 | France | 47/46 |
| 4326 | of 1900 | United Kingdom | 47/46 |
| 210568 | 2/1924 | United Kingdom | 47/46 |
| 1578765 | 11/1980 | United Kingdom | 47/31 |

Primary Examiner—James R. Feyrer
Attorney, Agent, or Firm—Robert G. Slick

[57] ABSTRACT

A growing frame for plants is provided wherein the framework consists of aluminum members which support a plastic netting. Single or multiple sections can be provided and a simple method is provided for fastening the netting to the frame and adjusting the tension on the netting.

3 Claims, 4 Drawing Figures

GROWING FRAME

SUMMARY OF THE INVENTION

In growing climbing plants, including vegetables and flowers such peas, sweet peas, cucumbers, beans and the like it is necessary that some support be provided for the plants. In the past, improvised supports have been made using chicken wire strings and other support means, ordinarily held on wooden poles.

The main disadvantage of such prior art structures is that they do not provide a neat appearance and further require a substantial amount of time to erect.

In accordance with the present invention a growing frame is provided wherein the uprights are made of "T"-shaped or "L"-shaped sections of metal, preferable of a metal which does not rust such as aluminum.

The cross-members utilized in acordance with the present invention consist of metal formed to a desired shape including a slot for receiving a horizontal support member and also a slot which opens to the surface of the extrusion so that it is easy to clamp and remove the netting material. The cross-members can be extruded or formed from sheet material.

The growing frame of the present invention is easy to set up and take down and single sections can be moved from place to place without dismantling the frame.

The support for the plants consists of a netting such as the ordinary polyolefin netting which is sold as bird netting. This netting resists rot, is strong and can be reused many seasons.

In accordance with one embodiment of the invention, multiple sections of the frame can be provided with "T"-shaped center posts on all except the outside sections so that the frame can be made to any desired length.

A further advantage of the present invention is that it comes in multiple sections so that one can make a relatively short frame or a relatively large frame just by adding an appropriate number of sections.

A still further advantage of the present invention is that it can be erected completely without the use of tools.

Other objects and advantages of the invention will be brought out in the balance of the specification.

DESCRIPTION OF THE PREFERRED EMBODIMENTS

Figure 2:
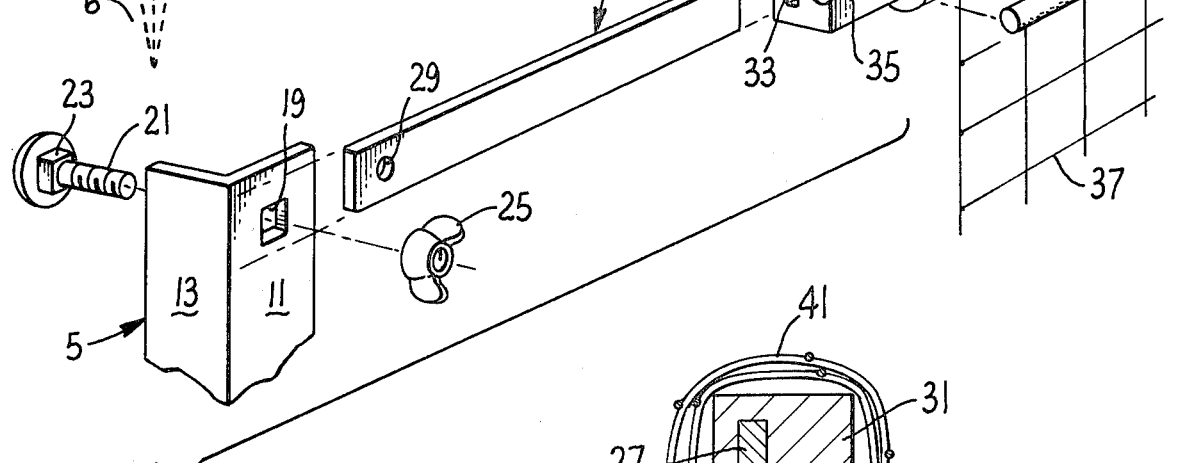
FIG. 2 is an exploded, enlarged view of the top corner of the growing frame.

Referring now to the drawings by reference characters, the growing frame of the present invention includes the end uprights 5 and 7 and a center upright 9. The end uprights, as is best seen in FIG. 2 are preferably of "L" shape having a front face 11 and a side face 13 at right angles thereto. The center post 9 has a "T"-shaped configuration, as is best seen in Figure, having a backward extending rib 15 and a front face 17 extending at right angles at either side thereof. Each of the uprights is sharpened as at 6 for ease of insertion in the ground.

As shown in FIG. 2 the front face of each of the uprights has a square hold 19 to accommodate a bolt 21 having a square shank 23. A thumb nut 25 is provided so that the device can be assembled without the use of tools since the square shank 23 prevents the bolt from turning. A similar hole is provided near the bottom for bolt 22.

The links generally designated 27, are made from bar stock, preferably aluminum, and have holes 29 so that bolt 21 can pass through.

The cross-members consist of bar stock, preferably of extruded aluminum. These are generally designated 31 and have a rectangular configuration with an elongated slot 33 near one terminal edge of a suitable size to mate with link 27. An open slot 35 is also provided which is semicircular in configuration and the opening is substantially less than the diameter of a circle for purposes later explained.

Figure 3:
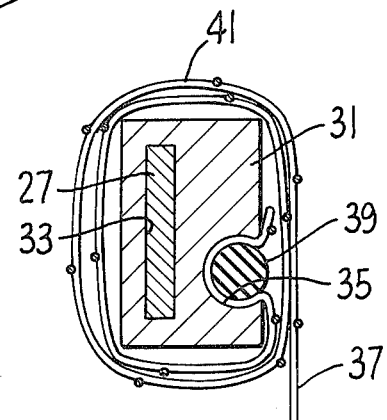
FIG. 3 is an enlarged section on the line 3—3 of FIG. 1.
Figure 4:
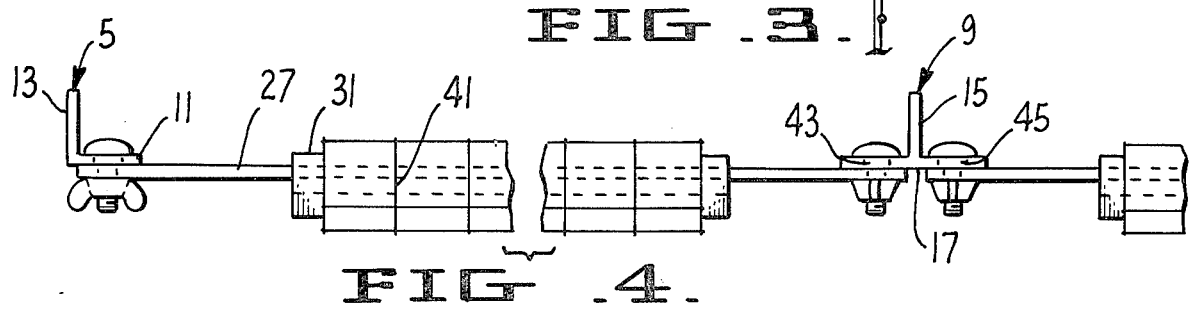
FIG. 4 is a top view of a portion of the growing frame shown in FIG. 1.

The netting proper is designated 37 and this is preferable of the polyolefin type ordinarily sold as bird netting to keep birds off of crops. As is best seen in FIG. 3, the netting is fastened to the cross-member by placing the netting across slot 35 and then pressing resilient member 39 into the slot. Both for the purposes of added strength and adjusting the length of the net, the netting is preferably wound around the cross-member 31 several times as is shown at 41.

In a small installation where only a single section is necessary, a "T"-shaped post 9 would not be employed; only two end posts 5 and 7 are required. When multiple sections are employed the "T"-shaped center post 9 is used and the front face has two square holes at the top and at the bottom such as those designated 43 and 45. These holes, of course, correspond in shape to the previously described hole 19. Thus when multiple sections are used the intermediate posts have the "T"-shape and the end posts in any given run can have the "L"-shape.

Figure 1:
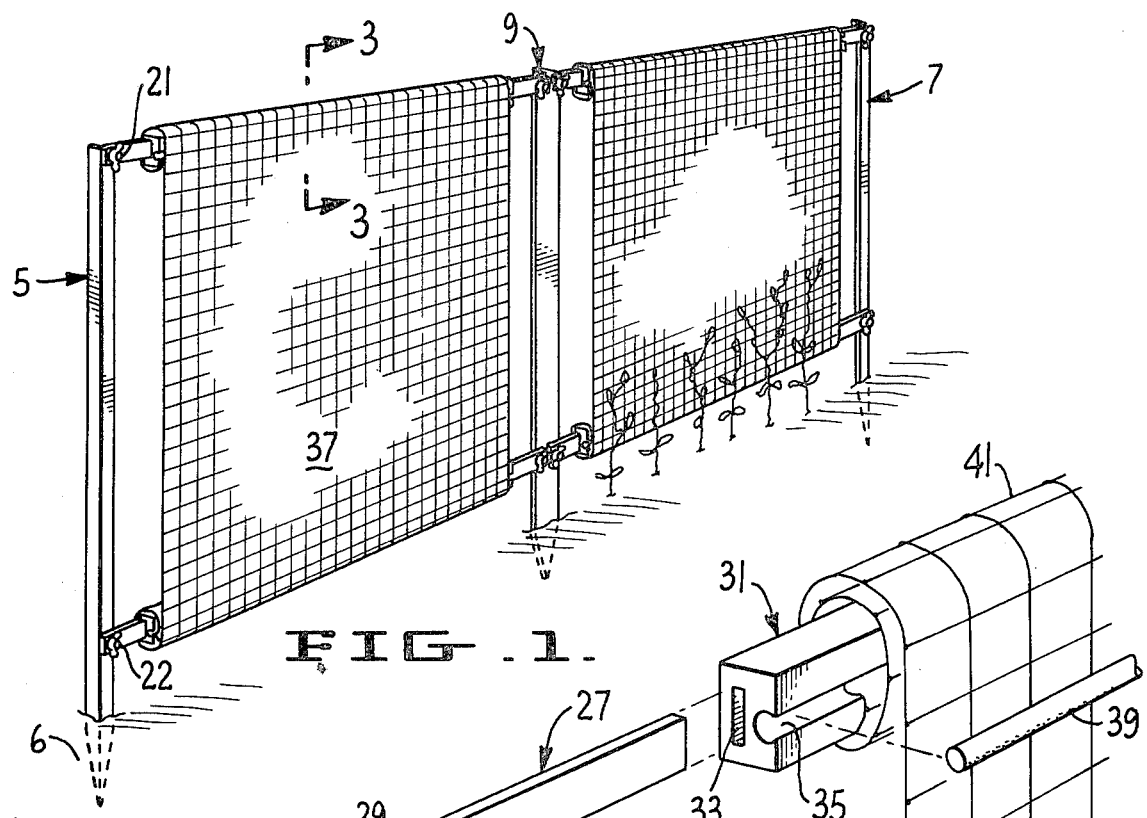
FIG. 1 is a perspective view of a growing frame embodying the present invention.

It will be understood that for purposes of illustration, FIG. 1 shows only a double section frame but by employing several "T"-shaped posts, such as at 9, any number of frames can be provided in a single line.

It is believed apparent from the foregoing that the frame of the present invention is strong, lightweight, attractive and easy to set up.

Although certain embodiments of my invention have been shown, it will be understood that many variations can be made without departing from the scope of this invention.

I claim:

1. A growing frame for plants including in combination:
   A. a plurality of posts designed to be placed in the ground in a generally vertical position, each post having a front face,
   B. holes near the top and bottom in the front faces of said posts for the reception of bolts,
   C. upper and lower horizontal members, each said horizontal members having a first laterally enclosed slot means opening to each end thereof and a second slot of arcuate configuration for netting attachment and opening to the front surface of said horizontal members, said posts and said horizontal members forming a frame,
   D. links bolted to the upper and lower holes of said posts, said links extending into said enclosed slot means, E. a plastic netting material wrapped around and attached to each of said horizontal members, whereby said netting is stretched between said upper and lower members to form said growing frame.

2. The frame of claim 1 including a plurality of sections, with "L"-shaped posts at the extremities of said plurality of sections and "T"-shaped posts between said "L"-shaped posts.

3. The structure of claim 1 wherein said netting is attached to each said horizontal member by forcing a resilient member on top of said netting and into said arcuate slot to lock the netting into said horizontal member.

* * * * *